United States Patent [19]
Hoisington et al.

[11] 3,854,909
[45] Dec. 17, 1974

[54] HEAT EXCHANGER FOR POWER PLANTS

[75] Inventors: Perry M. Hoisington, Coral Gables, Fla.; Austin G. Boldridge, Jr., Freehold, N.J.

[73] Assignee: HB2 Inc., New York, N.Y.

[22] Filed: Feb. 5, 1973

[21] Appl. No.: 329,700

[52] U.S. Cl............... 55/241, 55/257, 55/269, 261/140, 261/151, 261/152, 261/16, 261/30, 261/93, 261/112, 261/DIG. 11, 60/95 R

[51] Int. Cl. ............................................. F28c 3/08

[58] Field of Search ........ 55/241, 257, 269; 261/16, 261/30, 93, 112, 140, 151, 152, DIG. 11; 60/95 R

[56] References Cited
UNITED STATES PATENTS

| | | |
|---|---|---|
| 2,772,863 | 12/1956 | Harney et al. .......................... 261/93 |
| 2,887,308 | 5/1959 | Sala ............................. 261/DIG. 11 |

Primary Examiner—Albert W. Davis, Jr.
Attorney, Agent, or Firm—Albert F. Kronman

[57] ABSTRACT

A cooling means for dispensing the heat generated by atomic power plants or by any type of power generating unit using fossil fuel. Hot water (110°F) from a standard condenser is first put through a hydrojet device which mixes cool air (up to 80°F) with the water to form a type of emulsion. This mixture is then applied to a plurality of strip plates which are positioned in line with a stream of pre-cooled air (about 70°F). The water which drains from the strip plates (75°F) is recycled. The remainder of the water mixture is picked up by the air stream and blown through an exponential throat by power blowers and finally applied to a plurality of condensation vanes which are internally cooled by a liquid refrigerant. Normal air of 60 percent humidity and 90°F to 95°F temperature (wet bulb) is expelled into the ambient space and the condensed water is also recycled and sent back to the condenser unit.

12 Claims, 5 Drawing Figures

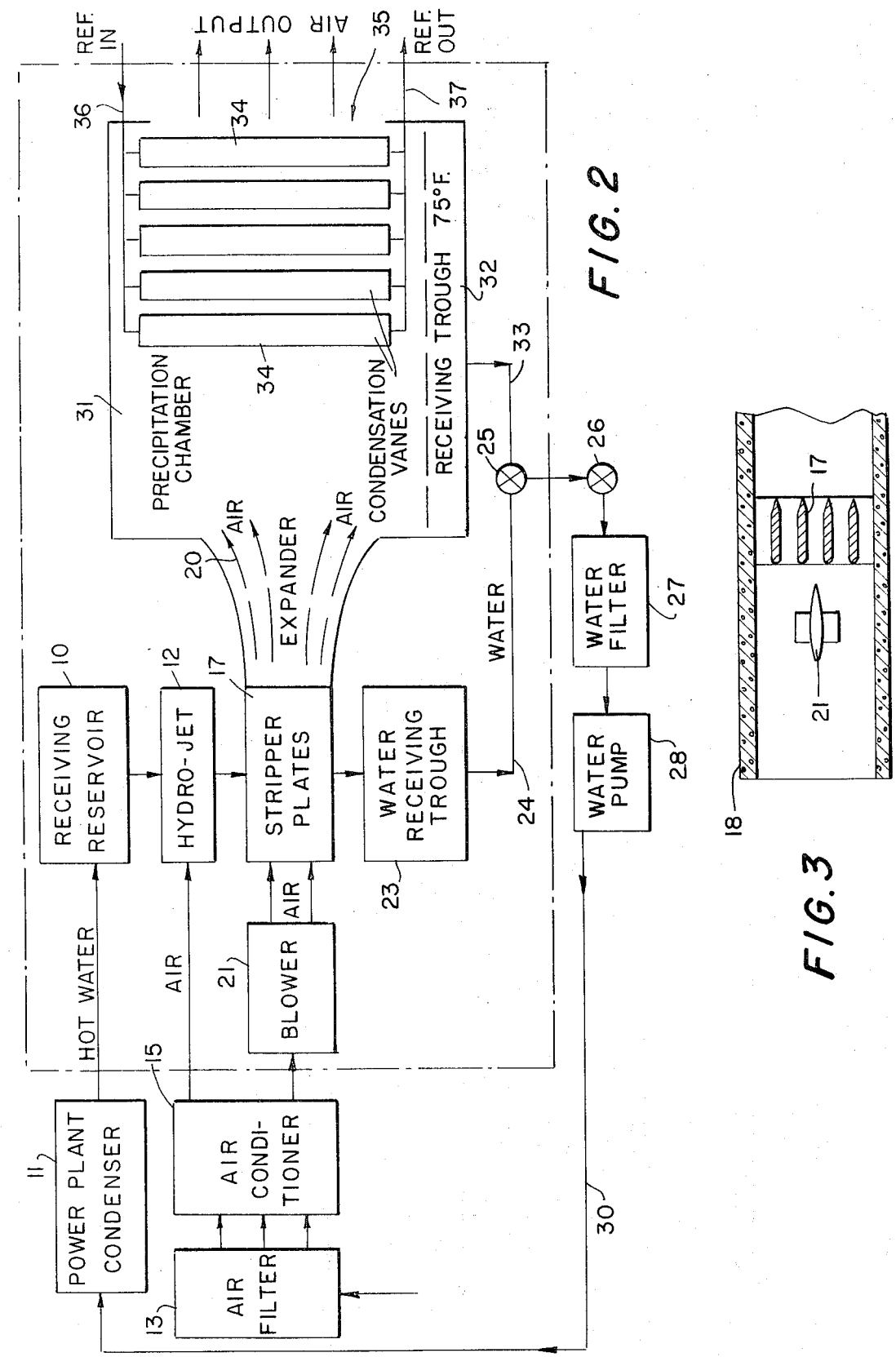

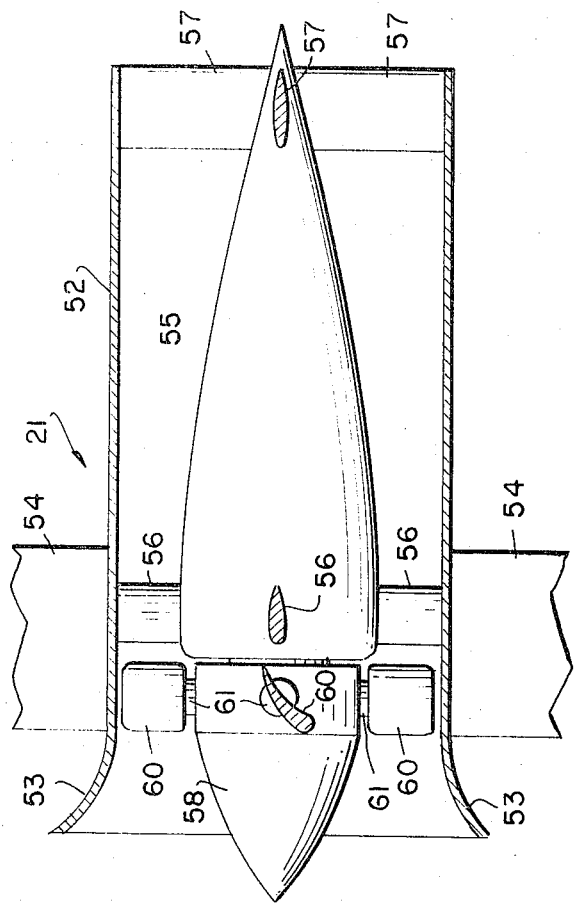
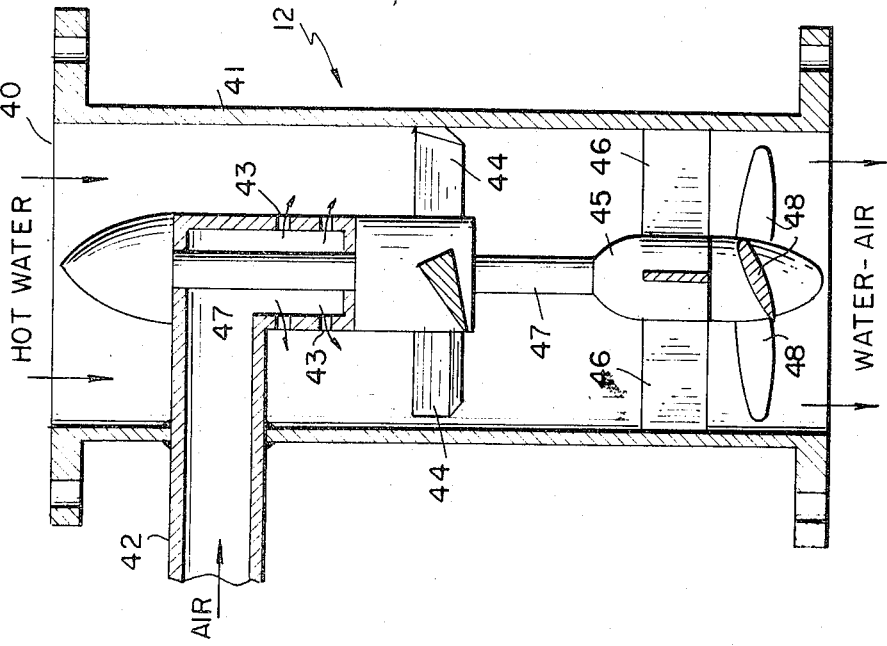

HEAT EXCHANGER FOR POWER PLANTS

BACKGROUND OF THE INVENTION

The problem of heat disposal from electric generating plants is easily solved for small units by disposal of the heat through heated water streams and the usual water run-off systems. Larger steam plants and especially atomic generating plants present problems of heat disposal which cannot be solved by the usual cooling towers or water spray units. A comprehensive review of cooling tower technology has been made by the Committee on Power Plant Siting, National Academy of Engineering, Washington, D.C. This 1972 report describes the major efforts which have been employed over the years in the development of cooling towers, and suggests in its conclusions that all of the tower structures are limited because of the "positive feedback" of moist air which can be re-introduced into the tower air-input. It is noted that no serious attempt has been made to reclaim evaporated water lost to the atmosphere.

A cooling system has been tried which discharges all the cooling water directly from the condenser into a nearby river or the sea. The result of such a practice has resulted in massive kills of marine life and holds little hope of this approach to condenser cooling.

The overall problem appears to be that of maintaining an optimum balance between the requirements of ecology and the demand for additional power. In the present proposed system substantially all the evaporated water used for cooling is returned to the system, all water being recycled through the system, and the excess heat is discharged to the atmosphere from the hot coils of a refrigerator system.

The present invention includes a first stage where ambient air is filtered, cooled, and applied to a hydrojet device which mixes the hot water from the condenser with the conditioned air and forms a type of emulsion with air bubbles interdispersed in the hot water. The air-water emulsion is directed to a second stage where most of the emulsion is deposited on a plurality of vertical strip plates. A stream of cool air is directed through the strip plate space by power blowers and the water drainage from the plates falls into a first return water trough and is eventually sent back to the power plant condenser. The power blowers send air (plus considerable moisture) from the strip plates into a third stage where the air posses through a plurality of vertical refrigerated vanes. The cold vanes cause the condensation of at least half of the water vapor in the air so that the air that emerges through the output port is about 50 percent humid. The refrigerated vanes also reduce the air temperature (to about 70°F) so that the output air characteristics are about the same as the ambient air. The condensed water which drips from the vanes is caught by a second receiving trough and sent back to the condenser.

One of the features of the present invention is the condensation of the water used in the system. All the water is collected, filtered, and reused in the condenser and heat exchanger units.

Another feature of the invention is the conditioning of all the air expelled to the atmosphere by the system. The expelled air has approximately the same wet bulb temperature as the ambient atmosphere so there is no pollution of the atmosphere.

Another feature of the invention is that no heat or water is discharged into any stream, pond, or into the ocean, thereby preventing any pollution from this system.

Other features and additional details of the invention will be disclosed in the following description, taken in connection with the accompanying drawings.

BRIEF DESCRIPTION OF THE FIGURES

FIG. 2 is a flow diagram showing the heat exchanger units within dotted lines and indicating the method of coupling to the power generator units.

FIG. 3 is a cross sectional view of the strip plates shown in FIG. 1 and is taken along line 3—3 of that figure.

FIG. 4 is a cross sectional view of a hydrojet mixing means for mixing hot water and cold air to form an emulsion.

FIG. 5 is a cross sectional view of one of the blowers used to move the cool air through the space occupied by the strip plates.

DESCRIPTION OF THE PREFERRED EMBODIMENT

Figure 1:
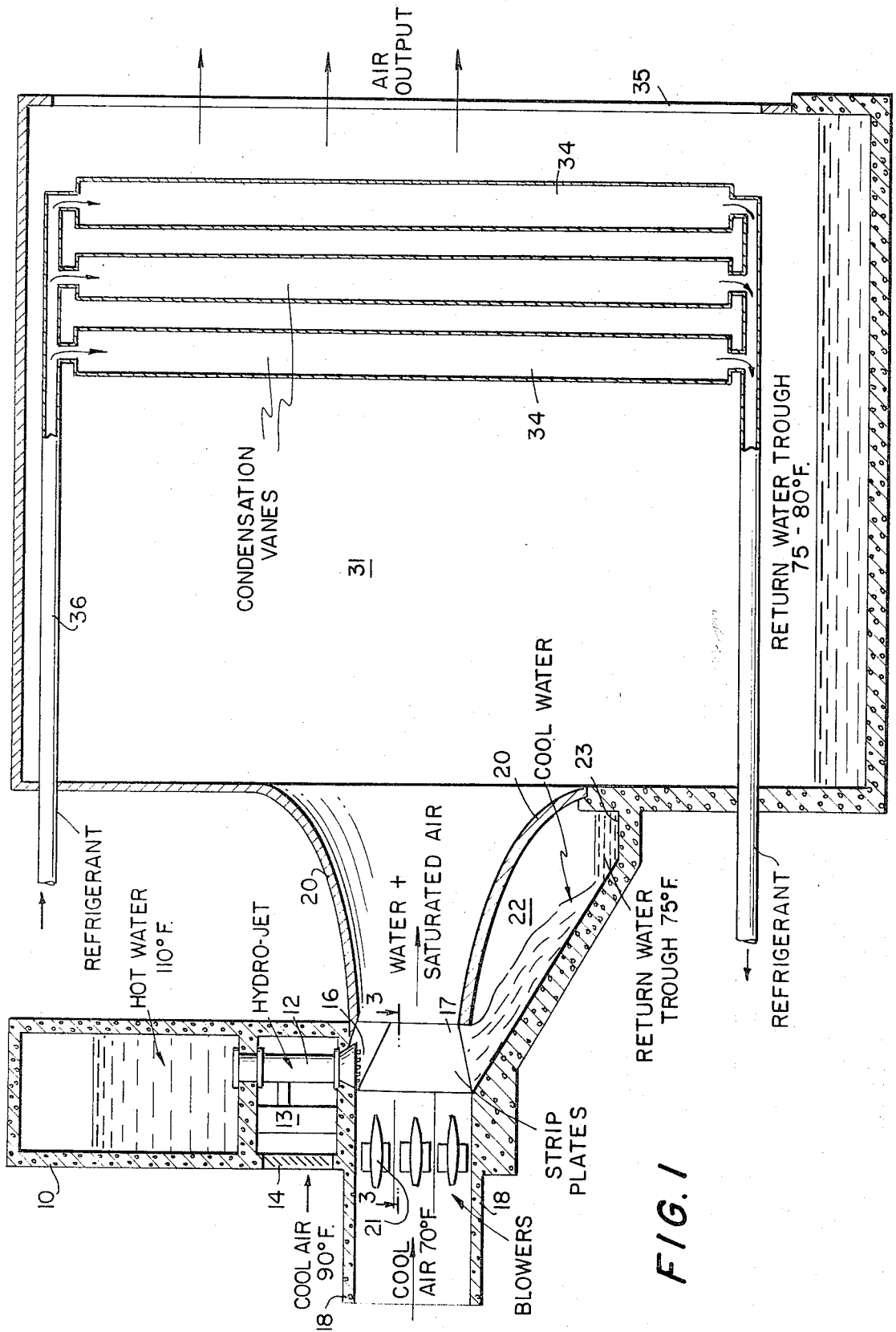
FIG. 1 is a cross sectional view of the heat exchanger system.

Referring now to FIGS. 1, 2 and 3, the heat exchanger system includes a hot water reservoir 10 which receives warm or hot water from the condenser 11. This water carries all the heat from the power generating unit that is to be disposed of and, for large generating units, may total many millions of gallons per minute. Directly below the water reservoir 10 is a hydrojet combination 12 which mixes the hot water with a stream of cold air. The details of this unit are shown in FIG. 4 and will be described later. Air for the hydrojet 12 is derived from a filter 13 and the atmosphere. The air enters the system through louvers 14. An air conditioner 15 may be added to the system in hot weather.

The hydrojet 12 mixes air with water from reservoir 10 and directs the resulting emulsion through a log periodic screen 15 into a chamber containing a set of strip plates 17. The chamber is a portion of a conduit 18 which is open to the atmosphere at one end and is connected to an exponential throat 20 at its other end. Between the entrance port and the strip plates 17, there is mounted one or more blowers 21, powered by an enclosed electric motor and designed to move ambient cool air through the strip plate chamber and then through the throat 20. The blowers 21 are conventional and are shown in greater detail in FIG. 5. The strip plates 17 collect considerable excess moisture from the air-water mixture and it drains into a lower chamber 22 and into a trough 23. From here the water passes into a conduit 24, through valves 25 and 26, a water filter 27, a water pump 28, and back to the power plant condenser 11 by way of conduit 30. Assuming that the initial hot water is 110°F and the input air from the atmosphere is 70°F, the water collected by the strip plates 17 and sent to trough 23 is not more than 75°F. The main function of the hydrojet mixer 12 and the strip plates 17 is to produce a stream of saturated air which is sent into a condensation chamber 31.

The condensation chamber 31 receives its saturated air from the throat 20. At the bottom of chamber 31 is a second return water trough 32 which is connected to conduit 33 and valve 25. Valve 25 joins the returning water from troughs 32 and 23 and provides a means for a controlled volume stream to the condenser 11. The chamber 21 is filled with hollow vanes 34, only a few being shown in the drawings. The vanes 34 are joined at their ends by suitable piping so that a liquid or vapor refrigerant can be applied to the interior of each of the vanes to cool them to about 70°F. The vanes cause the moisture in the air to condense on the vane surfaces, drip into trough 32, and be recycled through the condenser 11. The air is next discharged to the atmosphere through exit port 35. This air may have variable characteristics depending upon the temperature of the vanes and the volume of the air flow. It is believed that the best operation of the heat exchanger is realized when the humidity and temperature of the exit air is the same as the ambient atmosphere. In FIGS. 1 and 2 the input conduit 36 and the exit conduit 37 are shown connected to each end of the vanes. Other connections may prove to be more efficient, such as connecting all the vanes in series with the supply conduits.

FIG. 4 shows the details of the hydrojet 12 having a water input entrance 40 at one end of a casing 41. The air is admitted through a pipe 42 and is forced through a plurality of small holes 43. To provide more even distribution of the air bubbles, the air jets 43 are positioned equidistant from the axis of the casing 41. Additional mixture of the air and water is provided by four revolving wedge-shaped blades 44. These blades are not streamlined but are given shapes which will intentionally cause considerable turbulence and aid in the air-water mixing operation. Power to move the blades 44 and to force the mixture out of casing 41 is provided by an electric motor encased in a cylindrical head 45 which is secured to the casing by four struts 46. The motor turns shaft 47 and four propelled blades 48 which force the mixture into the chamber containing the strip plates 17.

FIG. 5 shows some of the details of the blower units 21 which are used to draw ambient air into conduit 18 and push the air-water mixture through throat 20, and through the chamber 31 containing condensation blades 34. Each blower unit 21 includes a cylindrical casing 52 having a flared entrance port 53. The casing 52 is secured to struts 54 and the walls 18 of the chamber. Inside casing 52, a streamlined compartment 55 is positioned, housing an electric motor (not shown) and secured to the casing 52 by four struts 56. Four additional struts 57 are used to anchor the end of the compartment 55 and to act as stabilizing fins to direct the air in a laminar flow. The motor turns a streamlined head 58 having four propeller blades 60 secured to its periphery. The blades 60 may be permanently secured to the head 58 by welding or they may be each secured to a short shaft 61, as shown in FIG. 5. Shaft 61 is adjustable so that the angle of incidence of the blades may be varied.

The operation of the heat exchanger has been made evident by the above description. Reference is made to FIG. 2 which shows a flow diagram of all the elements involved. Hot water, from the power plant condenser 11, is sent to the receiving reservoir 10 and then to the hydro-jet 12 where it is mixed with ambient air from conditioner 15. The air-water mix is then pumped to a compartment containing stripper plates which drain off most of the water collected and send it back to the condenser. The remaining air, which is now in a saturated condition is sent to a precipitation chamber 31 where the water is removed by cold condensation vanes 34. The partly dried air is then discharged into the atmosphere.

The two blowers 12 and 21 are provided with propeller blades 48 and 60 which are generally set at a permanent angle of incidence to the air and air-water mixture they propel. There may be some cases where the angular setting of the blades should be changed to meet changing conditions, and if this is the case, an angular variation can be made by installing a servomotor in each head 45 and 58, coupled to the blades and controlled by an external control circuit. Such servomotors are well known in the art.

The heat exchanger described above may be made as a modular unit with the exit port substantially square. Such a unit will have limited heat absorbing powers. For very large atomic generating plants, a plurality of these modular units are placed side by side to form a long exchanger device. In such an arrangement, many of the reservoirs can be connected to each other and the piping simplified.

Having thus fully described the invention, what is claimed as new and desired to be secured by Letters Patent of the United States is:

1. A heat exchanger for disposing of the heat present in water derived from a power plant condenser comprising: a hydrojet mixer for mixing the hot water from the condenser with ambient air to produce an emulsion-like mixture and for saturating the air in the mixture; a separation chamber adjoining the mixer for separating the water from the air in said mixture, said chamber including a set of strip plates for collecting the water in said mixture and for diverting it to a recycling trough, and a set of blowers for applying a stream of ambient air to the plates and for blowing saturated air from the chamber; and a condensation chamber including a plurality of refrigerated vanes for receiving the saturated air and for condensing the water in the air, a return water trough for collecting the water from the vanes for recycling in the condenser, and an exit port for directing the cooled and dehumidified air into the atmosphere.

2. A heat exchanger according to claim 1 wherein said mixer is mounted under a reservoir containing hot water from the condenser.

3. A heat exchanger according to claim 1 wherein said mixer comprises a motorized rotary fan, positioned in a cylindrical casing, a conduit for introducing air into the casing, a plurality of holes in the conduit for the entrance of ambient air, and means for supplying hot water to the casing.

4. A heat exchanger according to claim 1 wherein said blowers each comprise a streamlined casing, a motor within the casing and a revolving head including a plurality of propeller blades secured thereto.

5. A heat exchanger according to claim 1 wherein said strip plates are mounted vertically and perpendicular to the flow of the ambient air from the blowers.

6. A heat exchanger according to claim 1 wherein said condensation vanes in the condensation chamber are mounted vertically, have a generally flat cross section and are positioned so that their widest dimension is parallel to the surrounding air flow.

7. A heat exchanger according to claim 1 wherein the water draining from the strip plates and the water draining from the condensation vanes are joined in a common conduit and returned to the power plant condenser.

8. A heat exchanger according to claim 7 wherein the water collected in said common conduit is cleaned in a water filter and then delivered to a water pump for delivery to the condenser.

9. A heat exchanger according to claim 1 wherein the separation chamber and the condensation chamber are joined by an exponential throat for expanding the cross sectional area of the saturated air moving between said chambers to aid in condensing the water vapor in the moving air.

10. A heat exchanger according to claim 1 wherein the ambient air drawn into the separation chamber by the blowers is first passed through an air filter and then through an air conditioner to reduce its temperature and to eliminate some of its moisture.

11. A heat exchanger according to claim 10 wherein the air applied to said hydrojet is also drawn through the air filter and the air conditioner.

12. A heat exchanger according to claim 1 wherein said hydrojet includes an axial chamber for the mixing of air into the casing containing the hot water, said axial chamber connected to a source of dry cool air and formed with a plurality of spaced holes for the discharge of air streams.

* * * * *